March 20, 1962     W. B. ROGERS, JR     3,026,224
VIBRATION ABSORBING PAD
Filed May 1, 1959
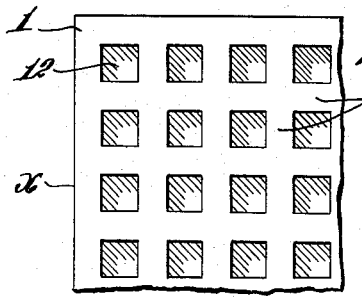
FIG. 1
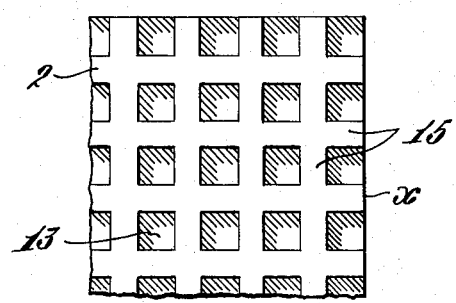
FIG. 2
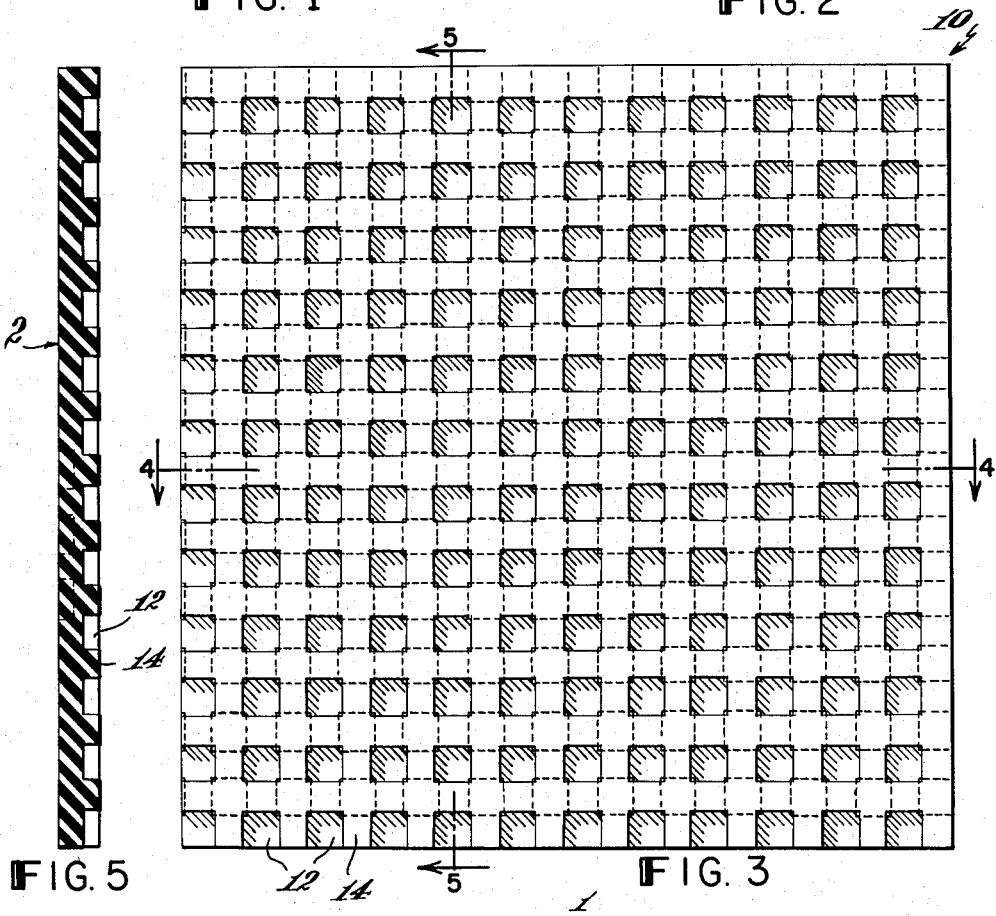
FIG. 3
FIG. 4
FIG. 5
FIG. 6
INVENTOR.
William B. Rogers, Jr.
BY
ATT'YS.

United States Patent Office 3,026,224
Patented Mar. 20, 1962

3,026,224
VIBRATION ABSORBING PAD
William B. Rogers, Jr., Dover, Mass., assignor to Fabreeka Products Company, Boston, Mass., a corporation of Massachusetts
Filed May 1, 1959, Ser. No. 810,429
1 Claim. (Cl. 154—44)

This invention relates to cushioning sheet material for use under the base of machinery and the like, for isolating and absorbing shock and vibration, and for deadening noise.

An object of the invention is to provide a vibration dampening pad, consisting in major part, at least, of an elastomer of such configuration as to permit adequate flow of the material, both horizontally and vertically, and the necessary deflection under the working load, and such vertical continuity of the material, between its upper and lower faces, as to insure stability in all directions.

Another object of this invention is to provide a novel, unitary, molded sheet of resilient material which will efficiently damp vibration produced by machinery mounted thereon, under loads from between 0 and 100 pounds per square inch, and particularly under loads of about 50 pounds per square inch. Further objects include the provision of a resilient sheet of the above type which is easily and inexpensively manufactured; which has the necessary resilience for vibration absorption; which is resistant to permanent set, and which is not injured by oil, customary cleaning fluids, or prolonged exposure to air or sunlight; which has a long-service life under normal conditions of use; and which is inherently resistant to lateral movement under load and to the intrusion of liquid or waste thereunder. These and other objects will be more readily apparent from the following more detailed description and by reference to the drawings wherein:

FIG. 1 is a fragmentary plan view showing one surface of a pad according to this invention;

FIG. 2 is a similar plan view of the opposite surface of said pad;

FIG. 3 is a plan view of a complete pad, showing one face in full lines, and indicating the recesses or pockets of the opposite face in dotted lines;

FIG. 4 is a section taken substantially on the line 4—4 of FIG. 3;

FIG. 5 is a section taken on the line 5—5 of FIG. 3, and

FIG. 6 is a fragmentary, diagrammatic sectional view, illustrative of the fact that for a major portion of its length, each wall of each recess merges, without interruption, with the material forming a rib at the opposite face of the pad.

Referring to the drawing, the embodiment illustrated comprises a resilient pad 10 having opposed surfaces 1 and 2, the pad being reversible so that either surface can constitute the top or the bottom surface, respectively. For convenience in following the structure of the two faces illustrated in FIGS. 1 and 2, the letter $x$ designates the same edge in the two views.

The pad 10 is provided on each surface with a plurality of equally-spaced, recesses or pockets, recesses 12 being provided in surface 1 and recesses 13 being provided in surface 2. In the arrangement here shown the pockets are square. The pockets or recesses 12 and 13 in the opposite faces of the pad are identical, except for their offset spacing to be described below, and are disposed in rows in each surface, the material which bounds the pockets forming ribs 14 and 15, respectively; the ribs in each respective face intersecting at right angles. The exposed surfaces of the ribs collectively constitute the top and bottom bearing surfaces of the pad.

FIG. 3 best illustrates the disposition of the recesses 12 and 13 in faces 1 and 2. The recesses in each face are so disposed that they are opposite the intersection of the ribs in the opposite face, recesses 12 being centered opposite the intersection of ribs 15; while recesses 13 are centered opposite the intersection of ribs 14. Preferably and as illustrated, the pockets exceed somewhat in surface area the area of the intersecting ribs. As shown in the sectional views FIGS. 4 and 5, the recesses 12 and 13 have a depth somewhat less than one-half the thickness of the pad, preferably about 40% of the thickness thereof. It should be noted that the material defining the periphery of any selected recess is continuous from the top to the bottom of the pad about the major portion of the periphery of each recess. In the embodiment illustrated, the boundary material is continuous for the full pad thickness about the periphery of each recess except at a small portion in each corner, the letter $m$ in FIG. 6 designating one wall of a recess 13 at a point where the elastomer is vertically continuous for the full pad thickness.

Elastomers such as natural or synthetic rubber are practically incompressible when fully confined, and it is therefore necessary, in order that the pad may deflect under compressive load, that the pad be designed to permit the rubber to flow. According to the present invention, the square mass of materital defined by the intersection of ribs of one face is free to deflect into a recess in the opposite face while that portion of the material of each rib, between rib intersections, which is continuous through the pad, is free to deflect laterally into the recesses. This arrangement provides a proper balance between supported and unsupported parts of the pads most effectively to absorb shock, vibration and noise and, at the same time, to provide maximum service life. It will be noted that the surfaces of the intersecting ribs at each face of the pad are all smooth, normally flat and in the same plane, so that while these elements are, for convenience, referred to as "ribs," each exposed face of the pad is level and devoid of grooves or channels. Furthermore, this arrangement provides a pad which will deflect a constant amount for the same unit loading regardless of the size of the pad. Since ribs are effectively bound by frequent intersections in two directions, the ribs provide great lateral stability and are not free to bend over under lateral force as frequently happens with channeled pads.

The present invention is particularly adapted for supporting lighter compressive loads, between 0 and 100 pounds per square inch, and preferably of 50 pounds per square inch. Although the thickness can be varied to suit particular conditions, the pad is preferably about five-sixteenths of an inch in thickness and preferably comprises an elastomer such as neoprene rubber having a Shore durometer hardness of about 50 for the lighter range of loads and about 70 for heavier loads. Also, preferably, the supporting surface of the pad, defined by the surfaces of the rib, comprises of the order of 68% of the surface area of the pad.

Another important feature of the present invention resides in the fact that the recesses 12 and 13 constitute suction cups which grip the floor or other mounting surface and the foot of the equipment or machinery mounted upon the pad. With this arrangement, anchoring bolts for the equipment are often unnecessary and the intrusion of liquids and other waste materials between the pad, floor and machine is prevented. Where bolts are not required, the pads are easily transferred to a new location and reused. Also, special sizes and thicknesses of pads are usually unnecessary since the pad can be cut, smaller pieces can be laid in edge-to-edge abutment, and the pads can be stacked to provide greater thickness. For best results, pads should be provided which extend out from the machine base approximately ¼ inch.

In a particular example of a pad according to the present invention, the resilient material comprises neoprene compounded for optimum set and oil resistance and having a durometer hardness of about 50. The recesses constitute squares 0.282 inch on a side and 0.130 inch in depth; the overall pad being 0.30 inch in thickness with the ribs on each surface being 0.218 inch in width. This particular pad deflects about one-sixteenth inch under a loading of about 50 pounds per square inch.

It should be understood that the foregoing description is for the purpose of illustration only and that the invention includes all modifications falling within the scope of the appended claim. While the edges of the recesses are square as herein shown, they can be rounded if desired.

I claim:

A shock-absorbing, vibration isolating, noise-deadening, antislip resilient pad for use under a machine which imposes a downward pressure of as much as fifty pounds per square inch and which is inherently resistant to lateral motion, when loaded, said pad consisting of a unitary homogeneous sheet of oil-resistant elastomeric material having a Shore durometer hardness between about 50 and 70 so that the pad deflects only about 20% under a load of 50 p.s.i., the pad having substantially uniformly spaced, square recesses in its lower and upper faces respectively, the recesses being arranged in longitudinally and transversely extending rows wherein the recesses are so oriented that the material between the rows of recesses at each face of the pad forms longitudinally and transversely extending ribs of uniform width and which intersect at right angles, the width of each rib being approximately 0.218 inch and each recess being approximately 0.282 inch on a side, the normally horizontal, exposed surfaces of the ribs, at each respective face of the pad, being flat and in the same plane and collectively constituting the bearing surface at that face of the pad, the walls of each recess normally being vertical and the recesses being of a depth, measured inwardly from each respective bearing surface, such that the pad has a continuous, uninterrupted layer midway between its bearing surfaces, said layer being of a thickness approximating one-fifth that of the pad, each recess at one face of the pad being opposite to that square mass of material, at the opposite face, which is defined by two intersecting ribs at the latter face, each such square mass being unsupported, from beneath, except by the material of said midlayer; each recess is of a depth, measured inwardly from the corresponding bearing surface, of about 40% of the thickness of the pad; the pad is of the order of $5/16$ of an inch between surfaces, and the collective bearing surfaces of the ribs, on each face, comprises about 68% of the entire area of said face.

References Cited in the file of this patent

UNITED STATES PATENTS

| | | |
|---|---|---|
| 1,628,090 | Weiss | May 10, 1927 |
| 2,032,114 | Clements et al. | Feb. 25, 1936 |
| 2,087,248 | Fischer | July 20, 1937 |
| 2,088,113 | Madison | July 27, 1937 |
| 2,512,310 | Corson | June 20, 1950 |
| 2,534,137 | Lewis | Dec. 12, 1950 |